C. J. OLSON.
PRESSURE VALVE.
APPLICATION FILED JULY 30, 1919.
1,406,216.
Patented Feb. 14, 1922.
2 SHEETS—SHEET 1.
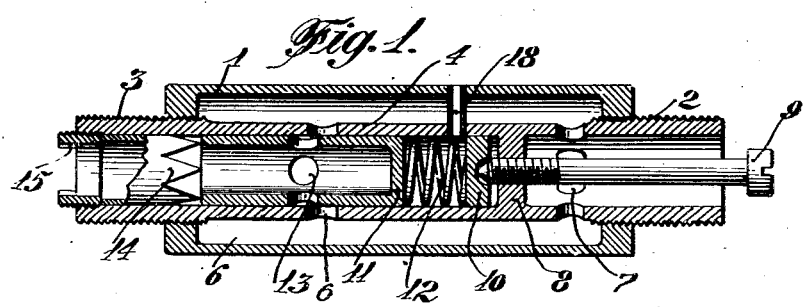
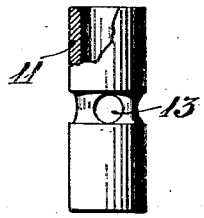
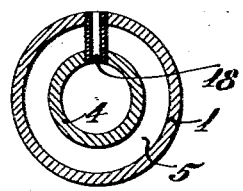
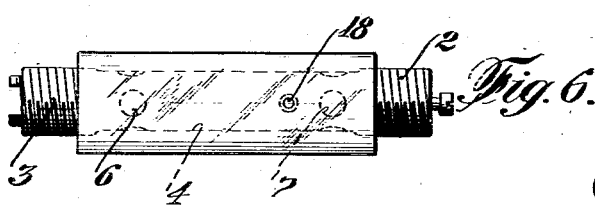
INVENTOR
Charles J. Olson
BY
William  Richards
ATTORNEY C. J. OLSON.
PRESSURE VALVE.
APPLICATION FILED JULY 30, 1919.
1,406,216.
Patented Feb. 14, 1922.
2 SHEETS—SHEET 2.
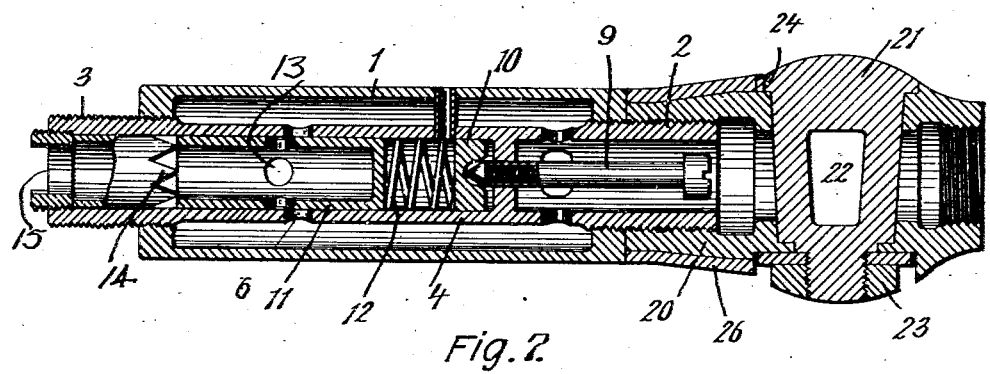
Fig. 2.
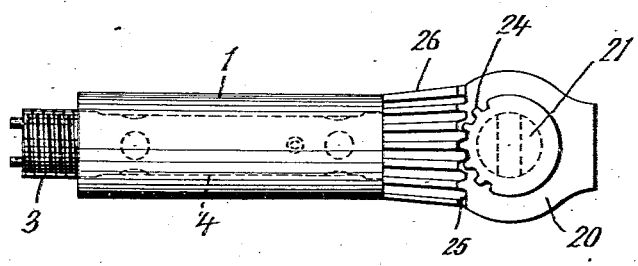
Fig. 8.
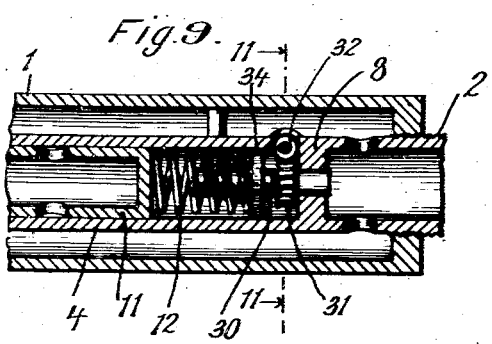
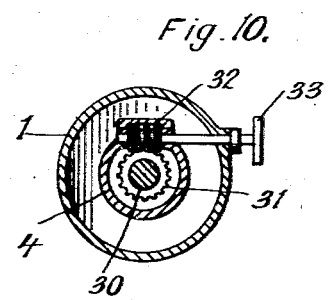
INVENTOR
Charles J. Olson
BY
ATTORNEY

UNITED STATES PATENT OFFICE.

CHARLES J. OLSON, OF MUSKEGON, MICHIGAN, ASSIGNOR TO THE OLSON PNEUMATIC SAW AND VALVE COMPANY, OF INDIANAPOLIS, INDIANA.

PRESSURE VALVE.

1,406,216.  Specification of Letters Patent.  Patented Feb. 14, 1922.

Application filed July 30, 1919. Serial No. 314,277.

*To all whom it may concern:*

Be it known that I, CHARLES J. OLSON, a citizen of the United States, residing at Muskegon, county of Muskegon, and State of Michigan, have invented certain new and useful Improvements in Pressure Valves, of which the following is a specification.

This invention relates generally to automatic regulating valves for fluid-operated motors.

Briefly, my device consists of a cylindrical casing having a cylindrical chamber therein, a piston slidable in said chamber and balanced by the pressure of a spring on one side and by the pressure of the fluid on the other. By a novel arrangement of parts, the fluid and spring are made to cooperate to regulate the fluid flow and pressure, as will become apparent in the description below.

One object of my invention is to provide a valve or throttle which will automatically govern the adjustment of its inlet so that a rate of fluid flow proportional to the load on the engine will always be maintained.

Another object is to provide a valve or throttle which will automatically operate to prevent the pressure in a line from mounting above any desired limit, pre-adjusted by the usual hand-valve.

Another object is to provide a safety valve which may be attached to the supply line near the boiler or compressor, or wherever else desired, so that, in the event of a break anywhere in the line, the fluid flow will be completely checked automatically by the valve. The advantage of the above is apparent on consideration of the great danger apt to result from the free escape of air, steam or water under pressure.

These and other objects will become apparent in the following description in association with the drawings:—

Figure 1 is a longitudinal sectional view of the valve, showing the relation of parts when it is used as a governor for the load on an engine.

Figure 2 is a detail elevation of the piston partly broken away and in section.

Figure 3 is a perspective of the adjusting sleeve.

Figure 4 is a perspective of the threaded adjusting ring.

Figure 5 is a cross section of the valve taken through the air vent.

Figure 6 is an elevation of the valve of Figure 1 with the exterior casing shown transparent to expose the interior.

Figure 7 is a similar view to Figure 1 showing a supply regulating plug valve embodied therewith.

Figure 8 is a plan view on a reduced scale of the construction shown in Figure 7.

Figure 9 is a fragmentary axial section showing a modified means for adjusting the control spring.

Figure 10 is a transverse section on the line 11—11 of Figure 9.

In the description below, characters of reference refer to similarly marked parts on the drawing.

Referring to Figure 1, the valve comprises an outer cylindrical casing 1 having inturned flanges at its ends providing reduced openings which are interiorly screw threaded. Inside of the casing 1 is a cylinder 4 of smaller diameter than the interior of the casing 1 so that a compartment 5 is provided. The cylinder 4 has its ends slightly thickened and exteriorly screw threaded as at 2 and 3 to screw into the openings in the end of the outer casing 1. The cylinder 4 has ports 6 near one end and ports 7 near the other end of the casing to provide communication between compartment 5 and the interior of said cylinder. Within the cylinder 4, near the ports 7, is a head or partition 8 which contains a threaded bore through which the adjusting screw 9 passes. A disk-like block 10 fits piston-like in the cylinder 4, and is cupped to receive the end of said screw 9. A hollow piston 11 is movable in said cylinder and is separated from said block by a helical spring 12, the end of the piston toward the flange 3 being open and the piston being provided with ports 13 in its side. A slidable sleeve 14, shown in Figure 3, is contained within the threaded end 3 of the cylinder 4 and adapted to bear against the outer end of the piston 11, the wall of said piston being adapted to cover the ports 6. A threaded adjusting ring 15 engages the interior threads of the end 3 and, on advancement, pushes the sleeve 14, and hence the piston 11, inward against the spring 12, said ring 15 having projections 16 for convenience in turning the ring with the fingers or with a tool. A vent 18 communicates between the cylinder 4 and the exterior of the casing 1; this vent prevents an accumulation of air under pressure back of the piston which would resist its inward movement and prevent it from making a complete inward stroke, and also permits the introduction of lubricant to the piston.

My valve may be used wherever a fluid of any kind is used to do work; for clearness in illustration, I will assume that the valve is interposed and properly pre-adjusted in a steam line between the boiler and a steam engine. The valve is attached by the flange 2 to that side of the steam line leading from the boiler, and the flange 3 is connected to the line leading to the engine. The sleeve 14, which is practically an extension of the ring 15, should be set so that the inner ends of the ports 13 are slightly spaced inward from the outer ends of the ports 6 thereby establishing flow through said ports from the compartment 5 to the motor line. By experimenting, the gap is widened until the motor, without load, runs at the desired speed, and the tension of the spring 12 should be so adjusted that it will just hold the piston 11 against the sleeve 14 and slightly overbalance the back pressure due to the resistance in the motor. Of course, to adjust the spring, it is necessary to cut-off the steam supply and disconnect the entire device from the steam line. Under constant load the steam enters through the flanged opening 2 and passes into the compartment 5 through the ports 7. It continues to the end of the compartment 5 until it is deflected through the ports 6, whence it continues out into the line to the engine. The engine and its load cause a back pressure in the line which operates against the interior of the piston 11 to force the same against the spring 12. Now let it be assumed that the load on the engine is increased, forcing the piston 11 inward until the spring 12 is strained sufficiently to balance the pressure on the piston. Thus the shell of the piston, which acts like a shutter to the ports 6, further opens said ports and permits a larger flow of steam to the engine. Suppose now that the load is reduced. Then the back pressure on the piston 11 is correspondingly diminished, and the spring 12 pushes the piston outward, further closing the ports 6 and reducing the rate of flow of steam to the engine. Thus the valve is automatically operated by the load to vary the supply of steam to the engine in proportion to the load. To set the device so as to cut-off steam when the load or resistance reaches a predetermined point, the piston 4 is adjusted so that the initial gap through the ports 6 and 13 is defined by the outer ends of the ports 13 and the inner ends of the ports 6 and the tension of the spring is reduced so that when the resistance approaches the breaking point, the sleeve will be forced past the port 6 by the back pressure and the flow of steam will be cut-off.

In the embodiment of the invention shown in Figures 7 and 8 a valve casing 20 is screwed onto the projecting end 2 of the cylinder 4. This valve casing 20 carries a turning plug throttle valve 21 provided with the usual opening 22 and held rotatably in place by the nut 23 in the usual manner.

To provide for adjustment of the valve a lateral flange is formed on the projecting upper end thereof and is provided with gear teeth 24 which mesh with similar teeth 25 on the end of a barrel 26 loosely surrounding the end of the valve casing which is screwed on the cylinder, 4.

In Figures 9 and 10 I have shown a modified means whereby adjustment of the spring 12 may be effected while the valve is in place. In this modification a screw 30 is swiveled in the partition 8 and has fixed thereon a worm gear 31 meshing with a pinion 32 having an operating handle 33 projecting exteriorly of the casing 1. A head 34 is threaded on the screw 30 and serves as an abutment for the spring 12. It will be apparent that by rotating the handle 33 the head 34 will be moved longitudinally in the cylinder and so vary the pressure of the piston 11 for any given position of the latter the head being held against rotation by any well known means.

Having thus described my invention, what I claim as new and desire to secure by Letters Patent, is:—

1. A governor for fluid-operated engines comprising a casing, a cylinder in said casing spaced therefrom to provide a compartment, ports establishing communication between said cylinder and said compartment, a partition within the cylinder between the ports therein whereby fluid admitted through one end of the cylinder must flow through the compartment to the opposite end of the cylinder, a piston slidable in said cylinder to control the ports at the last-named end of the cylinder and operable by back pressure of the fluid to permit flow to the engine in proportion to the load on the engine, and a vent leading from the interior of the cylinder at the rear of the piston through the casing to the exterior of the same.

2. A governor for a fluid-operated engine comprising a casing, a cylinder in said casing spaced from the walls thereof to provide a compartment, ports establishing communication between said cylinder and said compartment, a piston slidable in said cylinder to control said ports and operable by back pressure of the fluid to permit flow into said engine in proportion to the load on said engine, a spring in said cylinder acting on said piston in opposition to the said back pressure, and adjusting means for said piston comprising a rod passing through the head of said cylinder and cooperating with the spring to control the movement of the piston in one direction, and a sleeve longitudinally movable in said cylinder and limiting the movement of the piston in the opposite direction.

3. A governor for a fluid-operated engine comprising a casing, a cylinder in said casing spaced therefrom to provide a compartment, ports establishing communication between said cylinder and said compartment, a piston slidable in the cylinder to control said ports and operable by back pressure of the fluid to permit flow into the engine in proportion to the load on the engine, a spring acting on the piston in opposition to the back pressure, and an adjusting sleeve mounted in the outer end of the cylinder and acting on the piston in opposition to the spring to initially set the piston to permit flow of fluid.

4. A governor for a fluid-operated engine comprising a casing, a cylinder therein spaced therefrom to provide a compartment between the cylinder and the casing, ports near each end of the cylinder establishing communication between the interior thereof and said compartment, a piston in said cylinder controlling the ports near one end thereof and operable under back pressure of the fluid to permit flow to the engine in proportion to the load thereon, a partition in the cylinder between the ports therein, a block in the cylinder between said partition and the piston, a spring disposed between the inner end of the piston and said block, a screw passing through said partition and engaging said block, one end of the casing being internally threaded, and a slidable sleeve and a threaded ring in said end of the casing at the outer end of the piston.

5. A device for the purpose set forth comprising a casing, a cylinder in said casing connected at one end with a source of fluid supply and at its opposite end with a motor and provided with ports near the ends of the casing whereby to establish communication between the interior of the cylinder and the interior of the casing, a partition within the cylinder intermediate said ports, a hollow piston slidably mounted in the cylinder between the said partition and the outlet end of the cylinder and provided with ports adapted to register with the ports in the cylinder near the outlet end thereof, yieldable means acting on the piston to move the same to the outlet end of the cylinder, the outer end of the piston being open and the inner end being closed whereby the piston is operated by the back pressure of the fluid in opposition to said yieldable means, and means acting on the outer end of the piston to initially set the same to permit a predetermined flow of fluid through the ports in the piston and the cylinder.

6. A governor for a fluid operated engine comprising a cylinder, a casing around the cylinder, ports in the cylinder permitting flow from the cylinder to the casing and from the casing to the cylinder in one general direction, a piston in the cylinder controlling the flow from the casing to the cylinder and exposed to back pressure from the engine, a spring acting co-operatively with said piston to automatically regulate the fluid supply according to the load, a movable abutment for said spring, and a member projecting exteriorly of the casing whereby said abutment may be moved.

In testimony whereof, I have signed my name to this specification in the presence of two subscribing witnesses, this 29th day of April, 1919.

CHARLES J. OLSON.

Witnesses:
EUGENE RICHESON,
FREDK YOUNG.